US008527376B1

(12) United States Patent
Bueche, Jr.

(10) Patent No.: US 8,527,376 B1
(45) Date of Patent: Sep. 3, 2013

(54) INCOME ITEMIZATION (75) Inventor: Michael Patrick Bueche, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 433 days.

(21) Appl. No.: 12/180,646

(22) Filed: Jul. 28, 2008

(51) Int. Cl.
*G06F 15/02* (2006.01)
*G06F 17/22* (2006.01)
*G07C 1/10* (2006.01)
*G07F 19/00* (2006.01)

(52) U.S. Cl.
USPC .................................. 705/32; 702/31; 702/42

(58) Field of Classification Search
None
See application file for complete search history.

(56) References Cited

U.S. PATENT DOCUMENTS

| | | | |
|---|---|---|---|
| 5,940,844 A * | 8/1999 | Cahill et al. | 715/268 |
| 6,173,270 B1 * | 1/2001 | Cristofich et al. | 705/37 |
| 6,347,306 B1 * | 2/2002 | Swart | 705/32 |
| 6,401,079 B1 * | 6/2002 | Kahn et al. | 705/30 |
| 6,411,938 B1 * | 6/2002 | Gates et al. | 705/30 |
| 6,611,807 B1 * | 8/2003 | Bernheim et al. | 705/36 R |
| 6,898,573 B1 * | 5/2005 | Piehl | 705/31 |
| 7,398,238 B1 * | 7/2008 | Calce et al. | 705/35 |
| 7,797,211 B1 * | 9/2010 | Reeth et al. | 705/35 |
| 2003/0055754 A1 * | 3/2003 | Sullivan | 705/31 |
| 2003/0149660 A1 * | 8/2003 | Canfield | 705/39 |
| 2003/0229522 A1 * | 12/2003 | Thompson et al. | 705/4 |
| 2004/0111300 A1 * | 6/2004 | Callen et al. | 705/4 |
| 2004/0111361 A1 * | 6/2004 | Griffiths et al. | 705/39 |
| 2005/0109836 A1 * | 5/2005 | Ben-Aissa | 235/380 |
| 2005/0209903 A1 * | 9/2005 | Hunter et al. | 705/9 |
| 2006/0020545 A1 * | 1/2006 | Lindheimer et al. | 705/40 |
| 2006/0111990 A1 * | 5/2006 | Cohen et al. | 705/32 |
| 2007/0168274 A1 | 7/2007 | Taylor | |
| 2008/0021799 A1 * | 1/2008 | Blowers | 705/30 |
| 2009/0106053 A1 * | 4/2009 | Walker et al. | 705/4 |
| 2010/0100561 A1 * | 4/2010 | Cooper et al. | 707/769 |

OTHER PUBLICATIONS

Stavins, Joanna. "Perspective on payments", Regional Review Q1 2003. pp. 1-9.

* cited by examiner

*Primary Examiner* — Gregory Johnson
(74) *Attorney, Agent, or Firm* — Brooks, Cameron & Huebsch, PLLC (57) ABSTRACT

Information provided with a direct deposit, a deposited check, or other negotiable instrument may be used to determine state, city, county, and/or other local income tax liability. Based on information associated with the deposit, the financial institution may determine where a user performed the work that triggered the income payment, where the income payment took place, what type of work is associated with the income payment, etc. This information may be used by the financial institution to provide income itemization and income tax liability information to the user via a user computing device.

21 Claims, 6 Drawing Sheets

INCOME ITEMIZATION

CROSS-REFERENCE TO RELATED APPLICATIONS

This application is related by subject matter to that disclosed in the following commonly assigned applications, the entirety of which are hereby incorporated by reference herein: U.S. patent application Ser. No. 12/180,610 and U.S. patent application Ser. No. 12/180,623, each filed on Jul. 28, 2008 and each entitled "Income Itemization."

BACKGROUND

An income tax is a tax levied on the financial income of persons, corporations, or other legal entities. The rates for different types of income, such as personal earnings (wages), capital gains, and business income, may vary and some may not be taxed at all. In addition to United States federal income tax, income tax may also be levied by individual states. The rates of state income tax vary from state to state. Not all states levy an income tax. In addition, some states allow cities and/or counties to impose income taxes above and beyond the federal and state income taxes. Some cities collect income tax on not only residents but non-residents employed in the city. This tax can even be incurred when a non-resident works temporarily in the city.

Many people receive payment of at least a portion of their income by direct deposit. Direct deposit is a banking term that refers to a system used to transfer money, such as the Automated Clearing House (ACH). ACH is the name of an electronic network for financial transactions in the United States. Payment into an account by direct deposit contains information pertaining to the amount of the deposit and the identification of the entity that made the deposit into the account (i.e., the payor). Income payments received by direct deposit may incur a state, city, and/or county income tax. Determining whether an income payment is subject to such income tax is burdensome, complex, and time-consuming.

SUMMARY

Information may be provided with a direct deposit, a deposited check, or other negotiable instrument and may be used to determine state, city, county, and/or other local income tax liability of a user. This information may be used by a financial institution to provide income itemization and income tax liability information to the user via a user computing device.

In an implementation, based on information associated with the deposit, the financial institution may determine where the user performed the work that triggered the income payment, where the income payment took place, what type of work is associated with the income payment, etc.

In an implementation, the user may revise the income itemization and income tax liability information, or the data or rules underlying the income itemization and income tax liability information.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
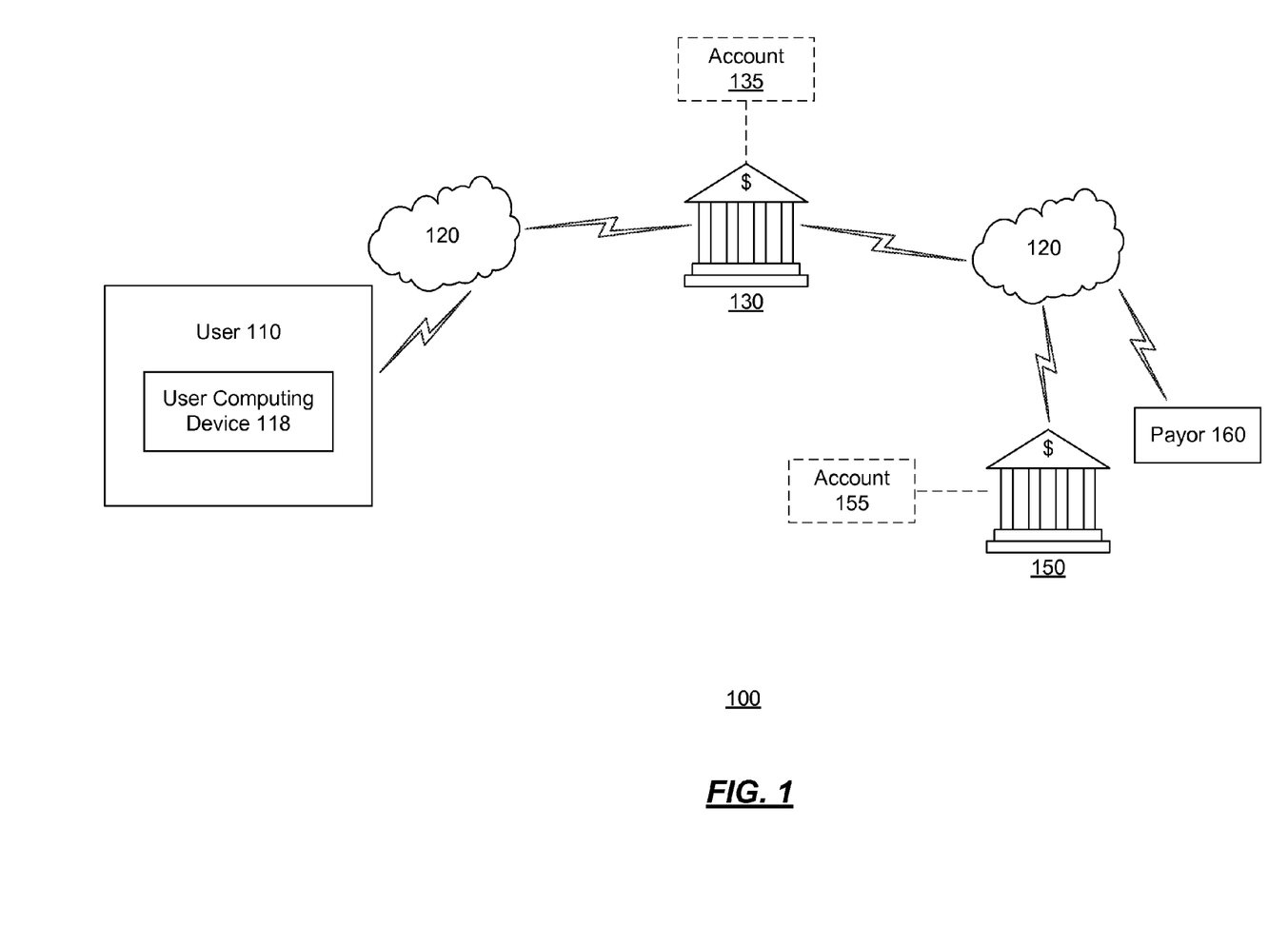
FIG. 1 is a block diagram of an implementation of a system in which example embodiments and aspects may be implemented.

FIG. 1 is a block diagram of an implementation of a system 100 in which example embodiments and aspects may be implemented. A direct deposit (e.g., associated with a paycheck or any check or negotiable instrument) may be made by a payor 160 via an account 155 with a financial institution 150 to an account 135 of an account owner (i.e., the payee), referred to herein as a user 110. The account 135 may be maintained by a financial institution 130 which may or may not be the same financial institution as the financial institution 150. As described further herein, information provided with the direct deposit may be used to determine state, city, county, and/or other local income tax liability that may be incurred by income associated with the direct deposit.

The financial institutions 130 and 150 each may be any type of entity capable of processing a transaction involving a negotiable instrument. For example, financial institutions 130 and 150 may be a retail bank, an investment bank, an investment company, a regional branch of the Federal Reserve, a clearinghouse bank and/or a correspondent bank. A negotiable instrument typically includes a type of contract that obligates one party to pay a specified sum of money to another party. Negotiable instruments may include a check, a draft, a bill of exchange, a promissory note, and the like.

The user 110 may be an individual who owns the account 135 that may be held at financial institution 130. The account 135 may be any type of account for depositing funds, such as a savings account, a checking account, a brokerage account, and the like. The user 110 may communicate with financial institution 130 by way of a communications network 120 such as an intranet, the Internet, a local area network (LAN), a wide area network (WAN), a public switched telephone network (PSTN), a cellular network, a voice over Internet protocol (VoIP) network, and the like. Additionally, the user 110 may communicate with financial institution 130 by phone, email, instant messaging, facsimile, and the like. Financial institutions 130 and 150 also may communicate with each other by way of the communications network 120.

In an implementation, the user 110 may receive payment from another individual or entity such as the payor 160 in the form of a direct deposit that is drawn from the account 155 at the financial institution 150. The user 110 may authorize the payor 160 to perform a direct deposit into the account 135. It is noted that although examples described herein may refer to a direct deposit that corresponds to a check, the techniques and systems described herein are contemplated for, and may be used for, deposit of any negotiable instrument.

A user computing device 118 may be associated with the user 110. The user computing device 118 may be any type of personal computer (PC) or handheld computing device such as a personal digital assistant (PDA) or a mobile phone, for example. As described further herein, the user 110 may receive data directed to income itemization and income tax liability at the user computing device 118. An example user computing device is described with respect to FIG. 6.

The financial institution 130 may receive a direct deposit data file representing a direct deposit from the payor 160 to the user 110 and may use any known processing software or other application(s) to obtain data from the direct deposit data file that may be used for income itemization and income tax liability information. Based on the information in the direct deposit data file, the financial institution 130 may determine where the user performed the work that triggered the income payment of the direct deposit, where the income payment took place (e.g., location of the payor 160, the account 155, and/or the financial institution 150), what type of work is associated with the income payment, etc. This information may be used by the financial institution 130 to provide income itemization and income tax liability information to the user 110 via the user computing device 118.

The financial institution 130 may include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may process the direct deposit and may provide income itemization and income tax liability information to the user 110.

Upon receipt and approval of the direct deposit data file, the financial institution 130 may credit the associated funds to the account 135. The financial institution 150 may then settle the direct deposit by debiting funds from the account 155 and crediting funds to the financial institution 130.

It will be appreciated that the preceding examples are for purposes of illustration and explanation only, and that an embodiment is not limited to such examples. For example, the account 135 and the account 155 may both be held at financial institution 130, in which case the direct deposit may be cleared internally.

In an implementation, a direct deposit, such as a payroll payment or a payment from a customer, may be made through the Automated Clearing House (ACH) system. In accordance with the rules and regulations of ACH, no financial institution may simply issue an ACH transaction (whether it be debit or credit) towards an account without prior authorization from the user 110. An ACH entry starts with the user 110 authorizing the payor 160 to issue ACH debit or credit to an account. The payor 160 can be a person or a company (such as one's employer). Depending on the ACH transaction, the payor 160 receives written, verbal, or electronic authorization from the user 110.

Once authorization is acquired, the payor 160 creates an ACH entry to be given to an originating depository financial institution (ODFI), which can be any financial institution that does ACH origination. This ACH entry is then sent to an ACH operator (usually the Federal Reserve System) and is passed on to the receiving depository financial institution (RDFI) (the financial institution from which the check is drawn (e.g., the payor's financial institution 150)). If the payor's financial institution 150 verifies the transaction, the ACH service provider may settle the transaction by debiting the payor's financial institution 150 and crediting the user's financial institution 130. The payor's financial institution 150 may then debit the payor's account 155.

A standard entry class (SEC) code is a three letter code that identifies the nature of the ACH entry. PPD is a code for Prearranged Payment and Deposits, and may be used for payroll direct deposits as well as for other types of deposits to the account 135.

In addition to the amount of a deposit and an identification of the entity that made the deposit, the direct deposit information may comprise data such as the location where the work that triggered the income payment associated with the direct deposit took place, the location where the direct deposit originated, the type of work that the direct deposit is payment for, etc. The financial institution 130 may use that information to determine income tax liablity information regarding the direct deposit. At some point, such as at the end of a quarter or year, for example, the financial institution 130 may provide information pertaining to the user's income tax liabilities based on the deposit information. The financial institution 130 may provide a summary of where the user 110 worked and how much money the user 110 made, so the user 110 may pay the appropriate income taxes for the states, cities, counties, etc. where the user 110 has an income tax liability based on the income received via direct deposit. This is useful for direct deposits made from various jurisdictions (e.g., states, cities, counties, etc.) where the deposits might invoke income tax liabilities for that jurisdiction. Thus, details of a paycheck may be exposed to the financial institution 130 and categorized by the financial institution 130.

In an implementation, direct deposit may be performed by ACH. ACH has an addenda record that has a free form field where 80 characters are available. The free form field and/or other fields in the ACH may be used to store the data such as the location where the work that triggered the income payment associated with the direct deposit took place, the location where the direct deposit originated, the type of work that the direct deposit is payment for, etc. Location data may include one or more zip codes. The payor 160 may enter information in the free form field that may identify where the work took place, such as city, county, state, zip code, etc. The payor 160 may provide an indication as to the portions of the income that are associated with particular types of work and/ or locations associated with the work that is associated with the direct deposit.

At some point, such as monthly, quarterly, or yearly for example, the financial institution 130 may generate an income itemization and provide it to the user 110 e.g., via the user computing device 118. The income itemization may comprise a report that provides an indication of income the user 110 earned over the year, via direct deposit, and where it was earned, who the payor 160 was, and for what type of work it was for, etc. Information pertaining to income taxes and/or income tax liability in the various locations (e.g., states, cities, counties, etc.) identified on the income itemization may be provided, along with estimates of income taxes owed, and links to one or more websites that may be helpful in determining and/or paying income taxes, for example.

In an implementation, the financial institution 130 may determine information for an income itemization from checks that are presented for deposit, either physically or electronically. The financial institution 130 may extract the account number and routing number from a check that is deposited by the user 110. The routing number is a nine-digit number located on the bottom left hand corner of the check. A unique routing number is typically assigned to every financial institution in the United States. The account number and routing number information may be used to determine a location where the income was earned or the payor 160 is located. Information pertaining to the location may be provided to the user 110. The user 110 may modify the location information as desired, and the financial institution 130 may store any revisions. For checks received in the future having the same account number and/or routing number, the location information, as revised by the user 110, may be used. At some point, an income itemization may be provided to the user 110 listing the income from the deposited checks and the location that each deposit corresponds to.

Figure 2:
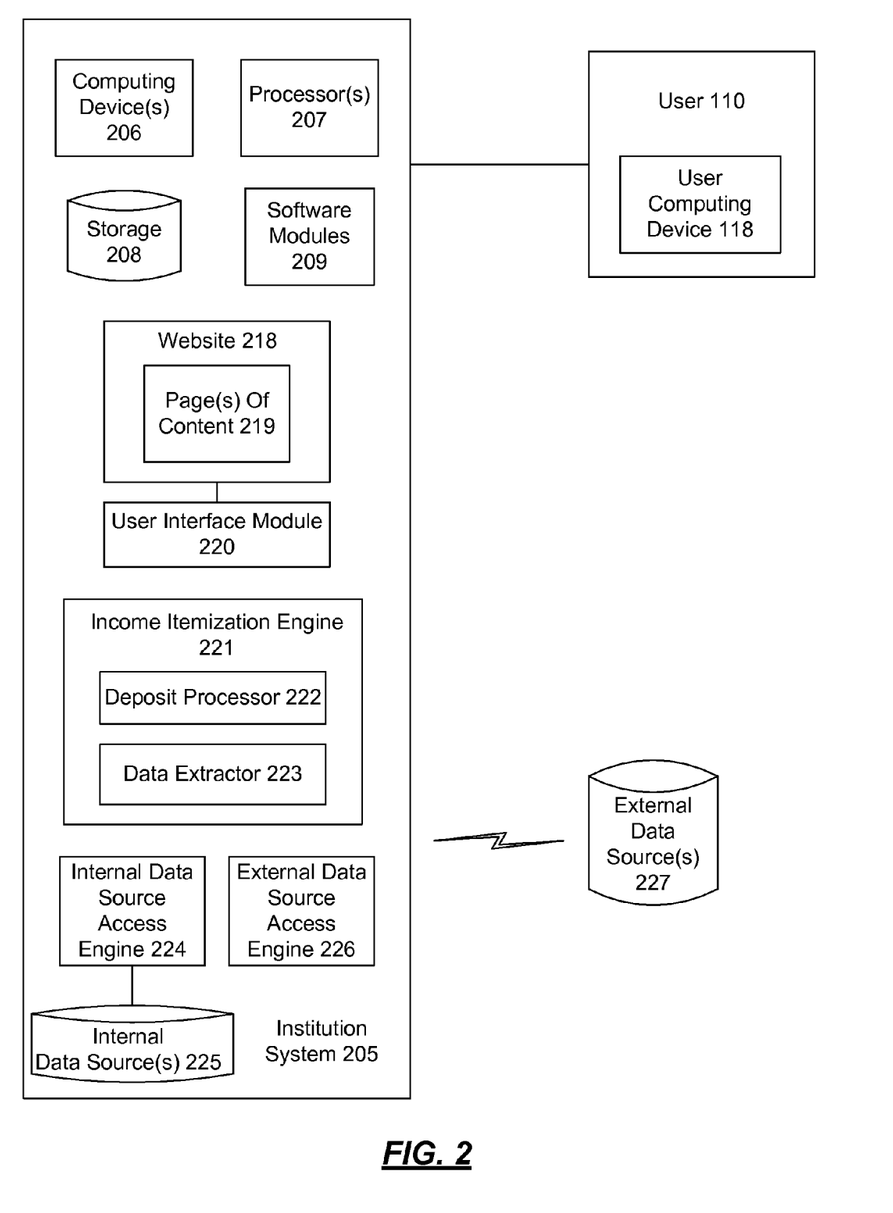
FIG. 2 is a block diagram of an implementation of a system that may be used for income itemization.

FIG. 2 is a block diagram of an implementation of a system that may be used for income itemization. An institution system 205 is associated with the financial institution 130 and may include a user interface module 220, an income itemization engine 221, an internal data source access engine 224, and an external data source access engine 226. The user interface module 220 may generate and format one or more pages of content 219 as a unified graphical presentation that may be provided to the user computing device 118 as an output from the income itemization engine 221. In an implementation, the page(s) of content 219 may be provided to the user computing device 118 via a secure website 218 associated with the institution system 205. The user computing device 118 and the institution system 105 may be connected over a network such as the network 120.

In an implementation, the institution system 205 may receive direct deposits and other deposits (e.g., electronic checks, paper checks, etc.), extract data from them to determine information that may be used to determine the income tax liability information for the user 110, and provide that information to the user 110. The institution system 205 may use any known data extraction software or other application(s) to obtain the relevant data for the income itemization from the direct deposits and other deposits.

The user 110 may interface with the institution system 205 via the website 218 that may display one or more pages of content 219 to the user 110 on the user computing device 118. A request for income itemization information may be received from the user 110 at the institution system 205 through any suitable means, such as interaction with a web browser that is in communication with institution system 205. The actual mechanism of connection is outside the scope of the present discussion. The request may be processed by an income itemization engine 221.

The income itemization engine 221 has access to data, files, and documents pertaining to the user 110 as well as any other data, files, and documents that may be useful in generating an income itemization and information pertaining to income tax liabilities that are currently stored by the financial institution 130 as well as external data, files, and documents.

The institution system 205 has the ability to retrieve information from one or more internal data sources 225 and one or more external data sources 227, in an implementation, via an internal data source access engine 224 and an external data source access engine 226, respectively. Data pertaining to the user 110, income, payors, locations, and/or tax liabilities may be retrieved from internal data source(s) 225 as well as external data source(s) 227. The retrieved data may be stored centrally, perhaps in storage 208. Other information may be provided to the institution system 205 from the user 110.

Internal data source(s) 225 may contain data, metadata, email, files, and/or documents that the institution system 205 maintains pertaining to the user 110, such as personal data such as name, physical address, email address, etc. and financial data such as credit card numbers and checking account numbers. Such data may be useful for generating an income itemization and income tax liability information as described herein. External data source(s) 227 may contain additional data and documents pertaining to the user 110, such as additional personal data and documents and/or financial data and documents which may be useful in generating an income itemization and income tax liability information. The institution system 205 may access this information upon receipt of a direct deposit or other deposit and when generating an income itemization and tax liability information for the user 110.

External data source(s) 227 may be associated with one or more entities that may be independent of each other. Each of the external data source(s) 227 may be a computer system that maintains data and documents that are not maintained by the institution system 205. It is contemplated that any number of external data sources may be in communication with the institution system 205 and may provide any type of data or document thereto.

The income itemization engine 221 may comprise a deposit processor 222 and a data extractor 223. The deposit processor 222 may receive a direct deposit data file or data file pertaining to another deposit such as a paper check or electronic check, and process the associated deposit. In this manner, the account 135 of the user 110 may be properly credited with the deposit.

The data extractor 223 may receive data from the deposit processor 222, the user computing device 118, and/or data in the internal data source(s) 225 and/or the external data source(s) 227. The received data may be processed by the data extractor 223 to extract information that may be used in an income itemization, such as deposit amount, payor 160, and supplemental information such as a description of the work and information that may be used to determine the location where the work performed by the user 110 took place that is associated with the income payment of the deposit or where the payor 160 or payor's financial institution 150 is located. After retrieving or otherwise receiving the information from the various sources, the data extractor 223 may use tools, applications, and aggregators, for example, to generate an income itemization and income tax liability information.

The user computing device 118 may provide user access to a system which is coupled to the institution system 205 and is configured to receive a plurality of requests, at least one of which is a request for income itemization information. A system may be configured to format and transmit a graphical user interface to the user 110, and through the graphical user interface provide the user 110 the ability to interact with information that may be maintained, requested, and/or provided by the institution system 205.

A user access system associated with the user computing device 118 may be communicatively coupled to the income itemization engine 221 and may be configured to send machine-readable instructions to the income itemization engine 221. Those instructions may cause the income itemization engine 221 to access one or more internal and one or more external data sources 225 and 227, respectively.

As mentioned above, the institution system 205 may provide a unified graphical presentation output. The unified graphical presentation may be transmitted to the user access system. In an implementation, the unified graphical presentation is combined with other materials and transmitted to the user 110. In an implementation, the unified graphical presentation is received by the user access system and transmitted directly to the user 110 without the inclusion of any other materials.

The user access system may be implemented as a web server in an implementation. The user access system, through the use of any suitable interactive web technology, provides an interactive experience to the user 110 through which access to and maintenance of income itemization data, income tax liability information, and related data can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 205 may comprise one or more computing devices 206. The computing device(s) 206 may have one or more processors 207, storage 208 (e.g., storage devices, memory, etc.), and software modules 209. The computing device(s) 206, including its processor(s) 207, storage 208, and software modules 209, may be used in the performance of the techniques and operations described herein.

Examples of software modules 209 may include modules that may be used in conjunction with generating an income itemization, generating income tax liability information, extracting data from deposit information, acquiring and aggregating user data, documents, files, etc., generating web page content for display, and receiving instructions from a user, for example. While specific functionality is described herein as occurring with respect to specific modules, the functionality may likewise be performed by more, fewer, or other modules. An example computing device and its components are described in more detail with respect to FIG. 6.

Figure 3:
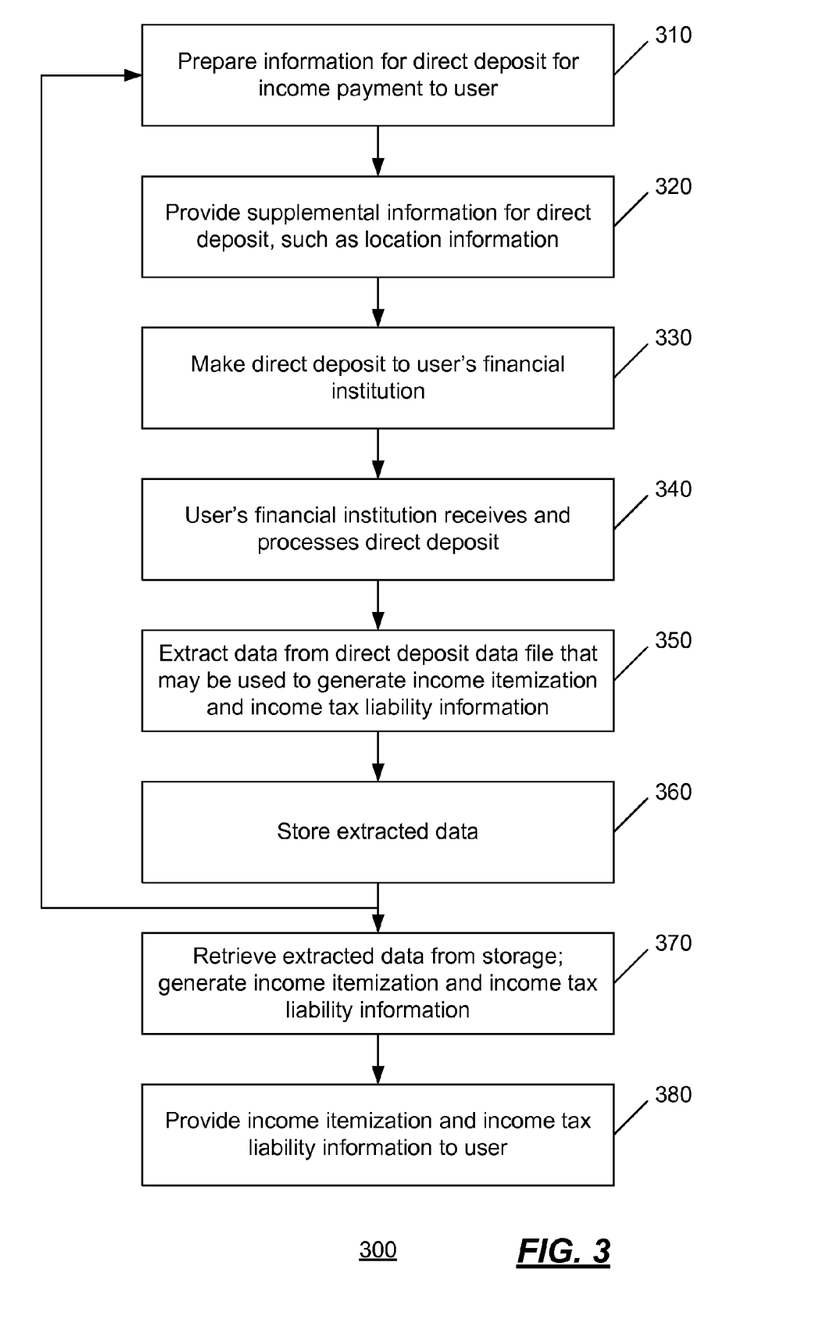
FIG. 3 is an operational flow of an implementation of a method that may be used for income itemization.

FIG. 3 is an operational flow of an implementation of a method 300 that may be used for income itemization. At 310, information for a direct deposit for an income payment to a user may be prepared, e.g., by a payor, payroll provider, etc. In an implementation, a payor may write a check via a payroll provider to the user's financial institution. The payroll provider may prepare to make the direct deposit through the ACH. The information for the direct deposit may contain the amount of the deposit and the identification of the payor.

At 320, supplemental information may be provided for the direct deposit. The supplemental information may contain information that may be subsequently used to determine whether the user may have income tax liability with respect to states, cities, counties, etc. The supplemental information may comprise location information as to where the services/products were rendered that triggered the income payment to the user, where the payor is located, where the financial institution that maintains the payor account is located, etc. The location information may comprise a zip code or other information pertaining to a location. The supplemental information may be appended to the direct deposit information, e.g., in a free form ACH field. In an implementation, the payor or a payroll provider may provide the supplemental information for the direct deposit.

At 330, the direct deposit may be made to the user's financial institution using any known technique such as ACH. At 340, the user's financial institution may receive and process the direct deposit and credit the amount to the user's account.

At 350, the user's financial institution may extract data from the direct deposit data file that may be used to generate an income itemization and income tax liability information. The extracted data may comprise the date of deposit, amount of deposit, payor as well as the supplemental information that was previously appended to the direct deposit information. The financial institution may store the extracted data at 360.

Multiple direct deposits may be processed over time using processing from 310 through 360.

At 370, the financial institution may retrieve the extracted data from storage and generate an income itemization and income tax liability information based on the extracted data as well as additional information that may be retrieved from internal or external data sources. The income itemization may comprise a listing of the direct deposits containing such information as date of deposit, amount of deposit, payor, location information of where the work took place, where the payor is located, where the payor financial institution is located, and the work that the user performed that is associated with the income corresponding to the direct deposit. The income tax liability information may comprise a listing of the various zip codes, locations, or jurisdictions (e.g., states, cities, counties, etc.) that the user may have an income tax liability in, and may provide an estimate of any income tax liability (e.g., listed by jurisdiction, tax rate, amount, due dates, etc.) and/or other information pertaining to income taxes in those jurisdictions (e.g., links to websites associated with the revenue departments or treasuries in the jurisdictions, links to websites providing income tax assistance, etc.).

At 380, the income itemization and income tax liability information may be provided to the user, e.g., via email, a web message, an instant message, a link to a website, or the like, mail, facsimile, etc. The user may determine how to proceed, e.g., pay taxes, consult with a financial advisor, get information from websites provided with income tax liability information, etc.

Figure 4:
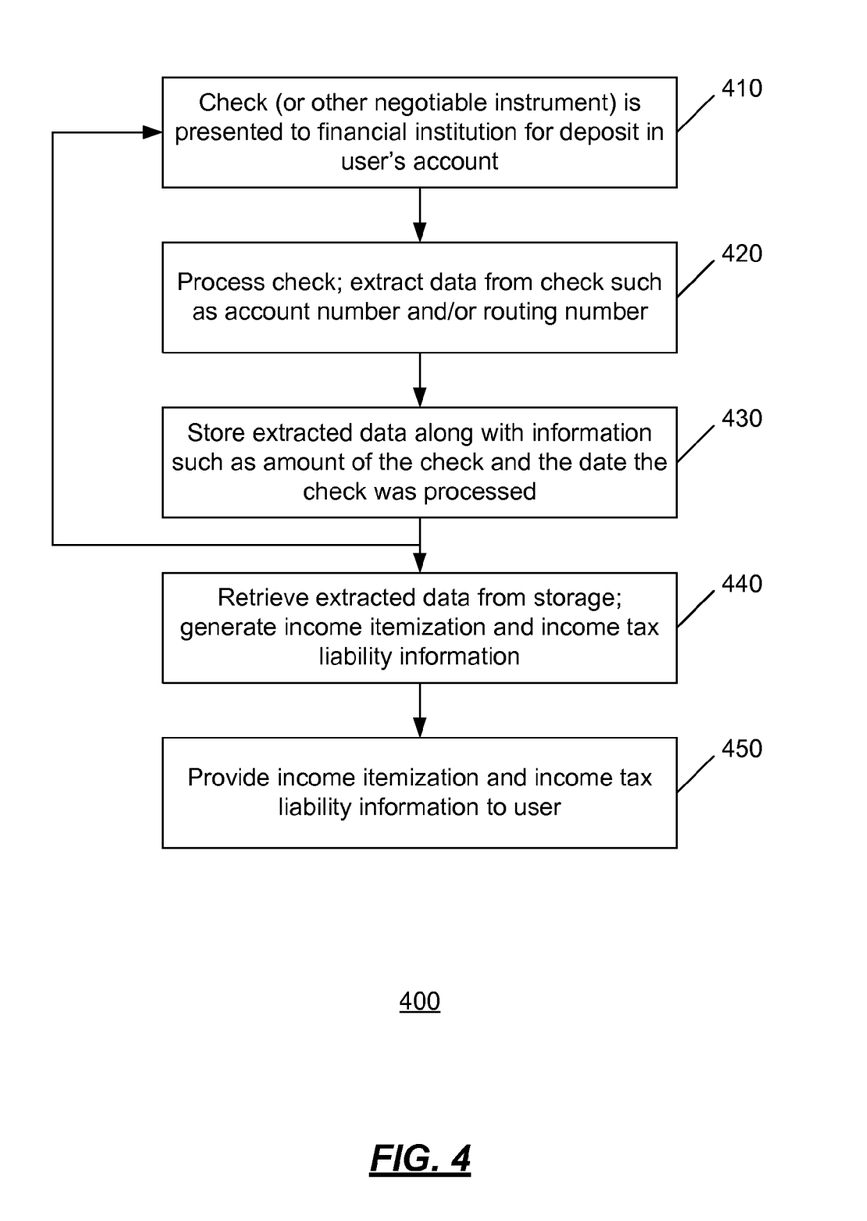
FIG. 4 is an operational flow of another implementation of a method that may be used for income itemization.

FIG. 4 is an operational flow of another implementation of a method 400 that may be used for income itemization. At 410, a user may electronically or physically present a check or other negotiable instrument to a financial institution for deposit in a user's account that is maintained by the financial institution.

At 420, the financial institution may process the check for deposit and extract data from the check, such as an account number and/or a routing number associated with the payor's account that may be funding the check. The extracted data may be stored at 430, along with information such as the amount of the check and the date the check was deposited. Multiple deposited checks may be processed over time using processing from 410 through 430.

At 440, the financial institution may retrieve the extracted data from storage and generate an income itemization and income tax liability information based on the extracted data as well as additional information that may be retrieved from internal or external data sources. The income itemization may comprise a listing of the deposits containing such information as date of deposit, amount of deposit, payor, and location information of where the payor financial institution is located. The location information may be based on the account number and/or routing number of the deposited check. In an implementation, the financial institution may determine location information by using a lookup table to determine what location the account number and/or routing number correspond to. Any other technique for associating an account number and/or a routing number to a location of the payor financial institution may be used.

As described above, the income tax liability information may comprise a listing of the various zip codes, locations, or jurisdictions that the user may have an income tax liability in, and may provide an estimate of the income tax liability and/or other information pertaining to income taxes.

At 450, the income itemization and income tax liability information may be provided to the user, e.g., via email, a web message, an instant message, a link to a website, or the like, mail, facsimile, etc.

Although the examples described herein may be directed to payments received by direct deposit or check, the techniques may be used with respect to payments received by a credit card or a debit card or other financial instruments. An income itemization and income tax liability information may be generated and provided to a user pursuant to receiving payment by a credit card or a debit card or other financial instruments.

Figure 5:
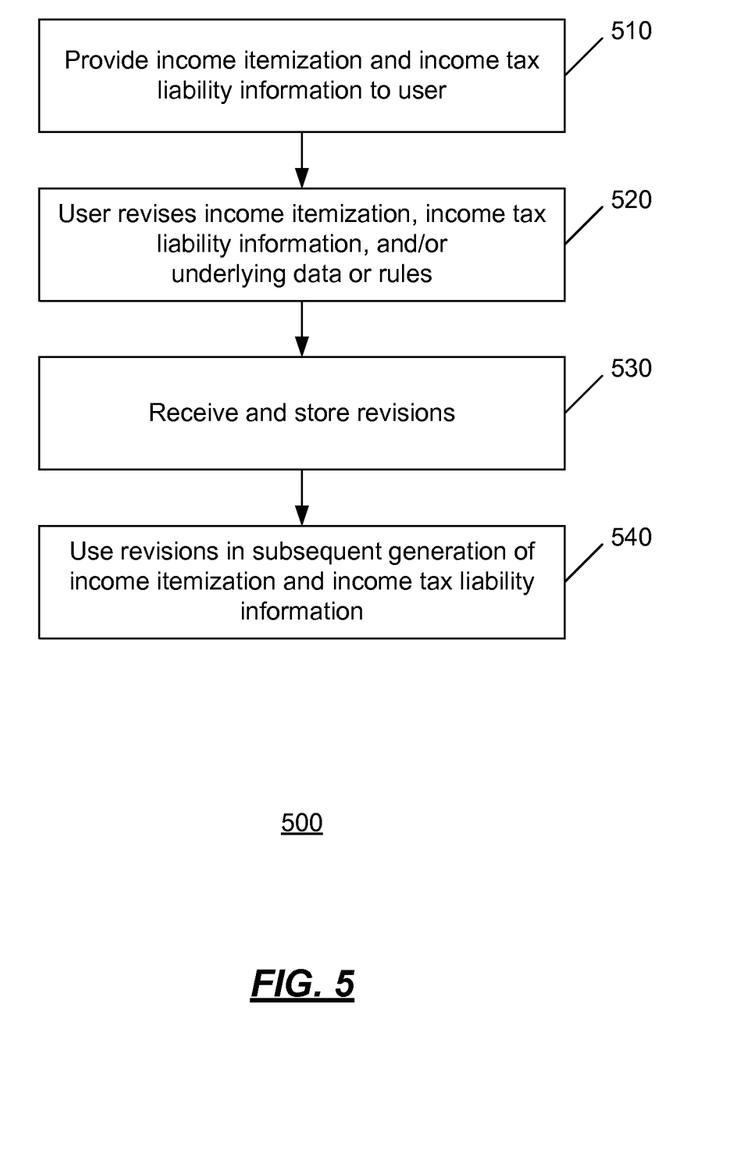
FIG. 5 is an operational flow of another implementation of a method that may be used for income itemization.

FIG. 5 is an operational flow of another implementation of a method 500 that may be used for income itemization. At 510, the financial institution may provide an income itemization and income tax liability information to the user.

At 520, the user may revise the income itemization and income tax liability information, or the data or rules underlying the income itemization and income tax liability information. In an implementation, the user may open a communication pathway with the financial institution by logging into a website for the financial institution. There may be several ways in which a communication pathway may be established, including, but not limited to, an Internet connection via a website of the financial institution. The user may access the website and log into the website using credentials, such as, but not limited to, a password and a username.

The user may review and revise the income itemization such as adding or revising descriptions of work associated with particular checks or direct deposits, adding or removing particular checks or direct deposits from the income itemization, revising locations associated with checks or direct deposits, etc. The user may also review and revise the income tax liability information, such as adding comments that may be helpful to the user in the future, identifying which income tax liability information is pertinent, revising tax rates, adding or removing links to websites, etc.

The data or rules underlying the income itemization and income tax liability information may also be revised and revised by the user. For example, the user may identify particular payor account numbers, routing numbers, or financial institutions and associate a type of work, a location, and/or an income tax liability rule with the payor. In this manner, subsequent checks or direct deposits received from the payor, as identified by the account number, routing number, or financial institution, may be associated with the type of work the user performed that is associated with the income corresponding to the deposit, location, and/or income tax liability provided by the user. As another example, the user may revise the deposit amounts associated with a particular location.

At 530, the revised information may be stored by the financial institution. The revised information may be used in a subsequent generation of an income itemization and income tax liability information for direct deposits and checks received in the future, at 540.

Exemplary Computing Arrangement

Figure 6:
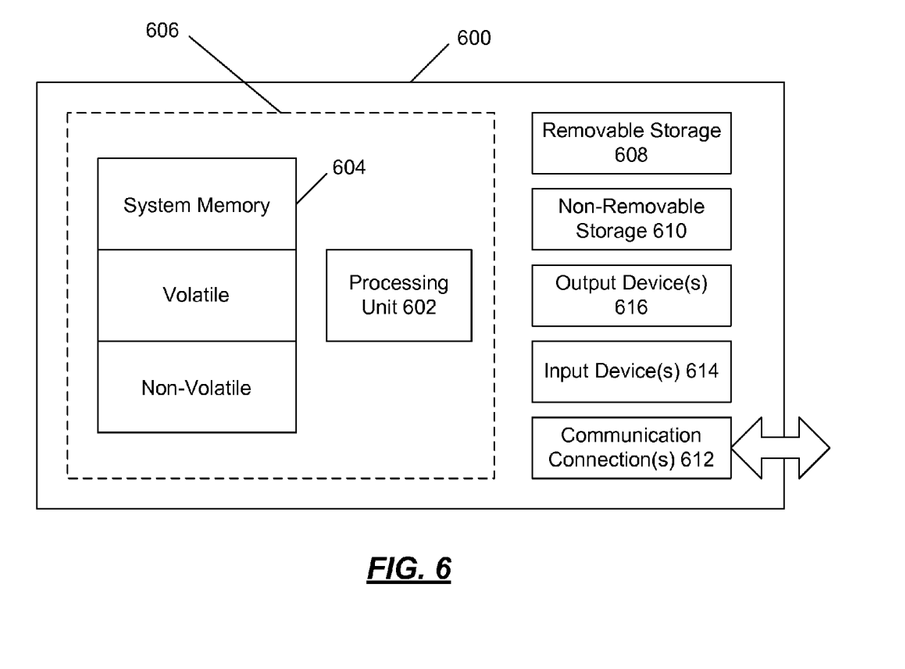
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and system memory 604. Depending on the exact configuration and type of computing device, system memory 604 may be volatile (such as RAM), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer-readable media. Computer-readable media can be any available media that can be accessed by computing device 600 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 604, removable storage 608, and non-removable storage 610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communication connection(s) 612 that allow the computing device 600 to communicate with other devices. Communication connection(s) 612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices 600 inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An income itemization method using a non-transitory computer-readable medium encoded with computer-readable instructions, the computer-readable instructions comprising instructions stored thereon that are executed by a processor, comprising:
    providing to a user, data associated with a deposit, the data comprising information associated with work performed by the user that is associated with the deposit;
    determining a location where the deposit originated based on the data associated with the deposit;
    receiving from the user, a revision to the data associated with the deposit;
    generating an income itemization based on the revision to the data associated with the deposit that includes a calculation of taxable income, wherein an applicable tax law used to calculate the taxable income is determined by a computer according to the location where the deposit originated; and
    providing the income itemization to the user.

2. The method of claim 1, wherein the information comprises a type of work, and the revision to the data comprises a revision to the type of work.

3. The method of claim 1, wherein the information comprises a location associated with a performance of the work, and the revision to the data comprises a revision to the location.

4. The method of claim 3, further comprising:
    generating income tax liability information based on the revision to the data, the income tax liability information comprising information pertaining to an income tax for a state, city, or county; and
    providing the income tax liability information to the user.

5. The method of claim 1, further comprising:
    storing the revision to the data; and
    processing data associated with an additional deposit to the user based on the revision to the data.

6. The method of claim 5, wherein the income itemization comprises the data associated with the additional deposit, and further comprising:
    generating income tax liability information pertaining to the deposit and the additional deposit in accordance with the revision to the data; and
    providing the income tax liability information to the user.

7. The method of claim 1, wherein the deposit comprises a check or a direct deposit.

8. A non-transitory computer-readable medium comprising computer-readable instructions for income itemization, said computer-readable instructions comprising instructions that:
    provide to a user, data associated with a deposit, the data comprising information associated with work performed by the user that is associated with the deposit;
    determine a location where the deposit originated based on the data associated with the deposit;
    receive from the user, a revision to the data associated with the deposit;
    generate an income itemization based on the revision to the data associated with the deposit that includes a calculation of taxable income, wherein an applicable tax law used to calculate the taxable income is determined by a computer according to the location where the deposit originated; and
    provide the income itemization to the user.

9. The non-transitory computer-readable medium of claim 8, wherein the information comprises a type of work, and the revision to the data comprises a revision to the type of work.

10. The non-transitory computer-readable medium of claim 8, wherein the information comprises a location associated with the performance of the work, and the revision to the data comprises a revision to the location.

11. The non-transitory computer-readable medium of claim 10, further comprising instructions that:
generate income tax liability information based on the revision to the data, the income tax liability information comprising information pertaining to an income tax for a state, city, or county; and
provide the income tax liability information to the user.

12. The non-transitory computer-readable medium of claim 8, further comprising instructions that:
store the revision to the data; and
process data associated with an additional deposit to the user based on the revision to the data.

13. The non-transitory computer-readable medium of claim 12, wherein the income itemization comprises the data associated with the additional deposit, and further comprising instructions that:
generate income tax liability information pertaining to the deposit and the additional deposit in accordance with the revision to the data; and
provide the income tax liability information to the user.

14. The non-transitory computer-readable medium of claim 8, wherein the deposit comprises a check or a direct deposit.

15. An income itemization system, comprising:
a machine including processor resources; and
memory resources associated with the machine, the memory resources storing machine readable instructions that, when executed by the processor resources, cause the processor resources to:
provide to a user, data associated with a deposit, the data comprising information associated with work performed by the user that is associated with the deposit;
determining a location where the deposit originated based on the data associated with the deposit;
receive from the user, a revision to the data associated with the deposit;
generate an income itemization based on the revision to the data associated with the deposit that includes a calculation of taxable income, wherein an applicable tax law used to calculate the taxable income is determined by a computer according to the location where the deposit originated; and
provide the income itemization to the user.

16. The system of claim 15, wherein the information comprises a type of work, and the revision to the data comprises a revision to the type of work.

17. The system of claim 15, wherein the information comprises a location associated with the performance of the work, and the revision to the data comprises a revision to the location.

18. The system of claim 17, further comprising:
at least one subsystem that generates income tax liability information based on the revision to the data, the income tax liability information comprising information pertaining to an income tax for a state, city, or county; and
at least one subsystem that provides the income tax liability information to the user.

19. The system of claim 15, further comprising:
at least one subsystem that stores the revision to the data; and
at least one subsystem that processes data associated with an additional deposit to the user based on the revision to the data.

20. The system of claim 19, wherein the income itemization comprises the data associated with the additional deposit, and further comprising:
at least one subsystem that generates income tax liability information pertaining to the deposit and the additional deposit in accordance with the revision to the data; and
at least one subsystem that provides the income tax liability information to the user.

21. The system of claim 15, wherein the deposit comprises a check or a direct deposit.

* * * * *